Figure 1:
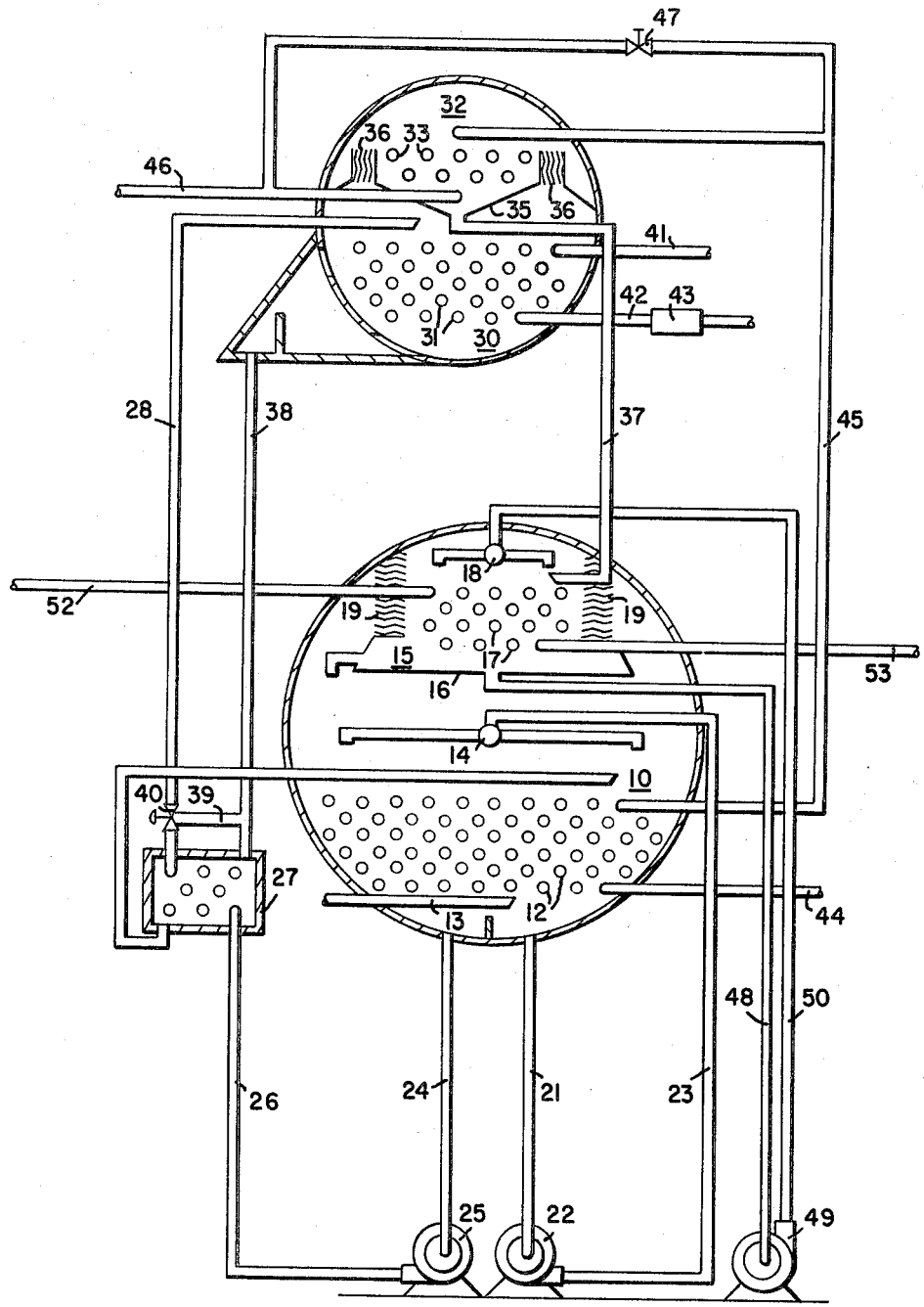

May 2, 1967 W. J. BIERMANN 3,316,736
ABSORPTION REFRIGERATION SYSTEMS
Filed Dec. 23, 1965 2 Sheets-Sheet 1

INVENTOR.
WENDELL J. BIERMANN.
BY Frank N. Decker Jr.
ATTORNEY.

3,316,736
ABSORPTION REFRIGERATION SYSTEMS
Wendell J. Biermann, 45 Foxcraft Drive,
Fayetteville, N.Y. 13066
Filed Dec. 23, 1965, Ser. No. 515,887
1 Claim. (Cl. 62—502)

This invention relates to absorption refrigeration systems and more particularly, to an absorption refrigeration system employing an improved absorbent solution.

Absorption refrigeration systems employ an evaporator containing a quantity of refrigerant liquid which is placed in heat exchange relation with a medium being cooled. The system also utilizes an absorber containing a quantity of an absorbent solution having a relatively low vapor pressure. The absorber and the evaporator are in communcation with each other so that refrigerant vapor generated in the evaporator passes into the absorber to be absorbed therein.

Heat from the medium being cooled is absorbed into the refrigerant in the evaporator thereby vaporizing refrigerant and chilling the medium to be cooled. The absorbent solution in the absorber is cooled by passing air or cooling water in heat exchange relation therewith. In practice, the absorbent solution is cooled to a temperature which results in the absorbent solution having a vapor pressure which is equivalent to the desired evaporator temperature.

It is common practice to design an absorption refrigeration system to utilize cooling water having a temperature of about 85° F. for cooling the absorbent solution. The refrigerant in systems of the type described is usually water, and the absorbent solution is commonly an aqueous lithium bromide solution. It is apparent that the absorbent solution cannot be cooled below the temperature of the cooling water and therefor the vapor pressure of the absorbent solution at 85° F. is a limiting factor determining the lowest temperature at which the evaporator may operate.

In some instances, it may be desirable to cool the absorber with a fluid, such as the effluent of a chemical process, having a higher temperature than 85° F. and yet provide a refrigerant evaporator temperature lower than can be provided with an aqueous lithium bromide absorbent solution at the same temperature. In still other instances, it may be desirable to be able to cool the absorber with a colder cooling medium than is normally employed without risking crystallization of the absorbent solution in the absorber or elsewhere in the system.

It is desirable to provide an absorption refrigeration system having an absorbent solution which exhibits a lower vapor pressure at a given temperature than previously employed solutions and which has a relatively high range of solubility so that it may be cooled to low temperatures without crystallizing. It is also desirable that an absorbent solution meeting the foregoing requirements be compatible with steel at high temperatures to enable its use in multistage or air cooled absorption refrigeration systems at temperatures greater than practical for lithium bromide systems.

Accordingly, it is a principal object of the invention to provide an absorption refrigeration system employing an absorbent solution which overcomes limitations associated with prior systems.

These and other objects of this invention are achieved by providing an absorption refrigeration system having an absorber, an evaporator, a generator and a condenser connected to provide refrigeration and containing a refrigerant, such as water, and a hygroscopic absorbent salt solution containing a lithium salt consisting essentially of lithium chlorate dissolved in a suitable solvent such as water.

Figure 2:
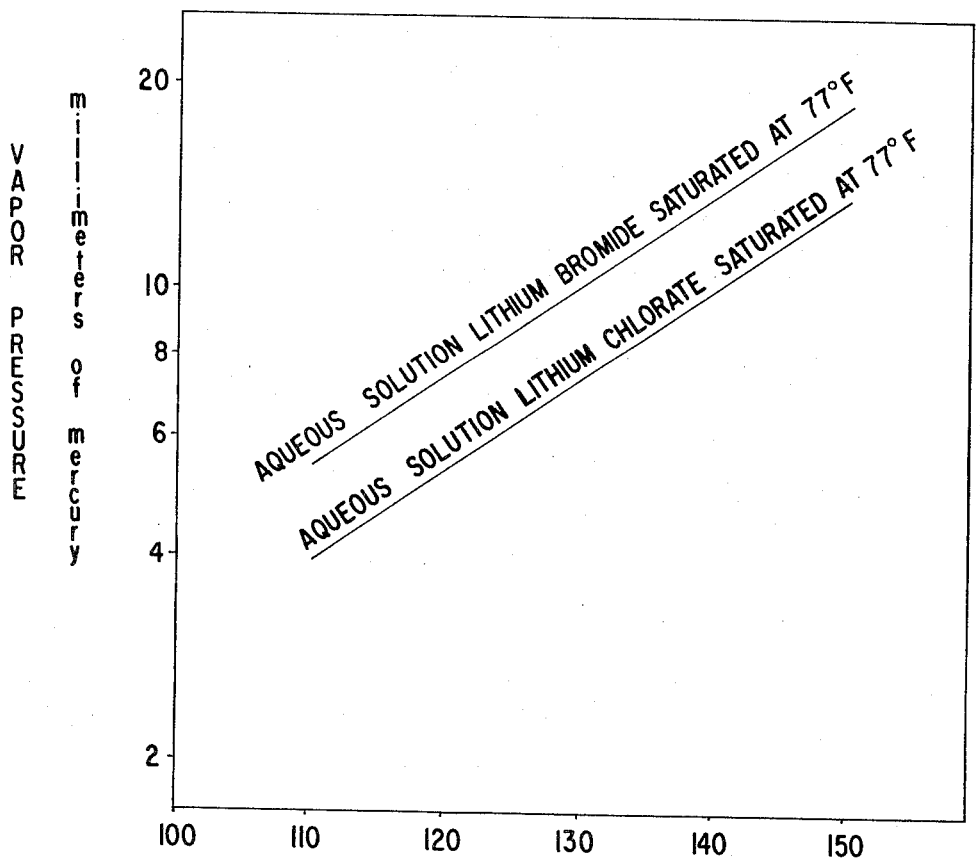

Other features of this invention will become apparent by reference to the following specification and attached drawings wherein:

FIGURE 1 is a diagrammatic cross-sectional view through an absorption refrigerant machine of a type adapted to employ an absorbent solution in accordance with this invention; and FIGURE 2 is a graph showing the vapor pressure-temperature characteristics of an absorbent solution according to this invention compared against a known absorbent solution.

Referring particularly to the drawing, there is shown a typical single stage absorption refrigeration system comprising an absorber 10 within a shell 11. A plurality of heat exchange tubes 12 are provided within the absorber. A purge line 13 is provided to conduct noncondensible gases from the absorber. A spray header 14 is located above the absorber.

Also disposed in shell 11 is an evaporator 15 comprising a pan-like member 16 within which is disposed a plurality of heat exchange tubes 17. A spray header 18 is located above heat exchange tubes 17 for distributing refrigerant thereover. Evaporator 15 is in open communication with absorber 10 through eliminators 19.

In operation, refrigerant is sprayed over tubes 17 in evaporator 15 and an absorbent solution is sprayed over tubes 12 in absorber 10. Consequently, refrigerant is vaporized in evaporator 15 and passes through the eliminators into absorber 10 where the refrigerant vapor is absorbed by the absorbent solution. The vaporization of the refrigerant in evaporator 15 cools the fluid passing through heat exchange tubes 17 thereby producing a cooling or refrigeration effect on the fluid.

Absorbent solution of intermediate strength, accumulated in the lower portion of absorber 10, is circulated through line 21, pump 22 and line 23 to spray header 14 in order to recirculate absorbent solution in the absorber. Weak absorbent solution is circulated by line 24, pump 25, line 26, solution heat exchanger 27, and line 28 to generator 30.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution.

The absorption of refrigerant vapor by absorbent solution in absorber 10 dilutes the absorbent solution and diminishes the refrigerant supply. In order to maintain the refrigeration system in operation, it is desirable to concentrate this weak solution by separating the absorbed refrigerant from it. For this purpose, a generator 30 and a condenser 32 are provided.

Generator 30 is located in shell 34 and comprises a plurality of heat exchange tubes 31 for passing steam or other heating fluid. Also located within shell 34 is condenser 32 comprising a pan-like member 35 within which is disposed a plurality of heat exchange tubes 33 for passing cooling water. Eliminators 36 are provided to prevent strong solution from being entrained in refrigerant vapor passed from generator 30 to condenser 32.

A line 37 leads from pan-like member 35 to evaporator 15 and serves to return condensed refrigerant from the condenser to the evaporator. Line 38 extends from generator 30 through solution heat exchanger 27 to absorber 10 and serves to return relatively hot, strong absorbent solution from the generator to the absorber while passing it in heat exchange relation with relatively cool, weak solution being forwarded to the generator for concentration thereof.

A bypass line 39 and bypass valve 40 having a suitable actuator mechanism may be provided for capacity control of the refrigeration system. Reference is made to Leonard Patent No. 3,054,272, granted Sept. 18, 1962, for a complete description of the operation of an absorption refrigeration system including the operation of bypass line 39 and bypass valve 40.

A steam inlet line 41 and outlet line 42 having a suitable steam trap 43 is provided to admit steam to heat exchange tubes 31 in order to vaporize refrigerant from weak solution supplied to the generator to concentrate the weak solution. The vaporized refrigerant passes through eliminators 36 and is condensed in condenser 32. A cooling water inlet line 44 is connected to heat exchange tubes 12 in absorber 10 from which the cooling water passes through line 45 to heat exchange tubes 33 in the condenser. The cooling water is then discharged through line 46 and appropriate bypass line and valve 47 may be provided to bypass cooling water around the condenser, if desired. The cooling water serves to remove the heats of dilution and condensation from the absorbent solution in absorber 10 and serves to remove the heat of vaporization to condense refrigerant vapor in condenser 32.

A recirculation line 48 and recirculation pump 49 pass refrigerant from pan 16 of the evaporator through line 50 to spray header 18 so that refrigerant may be sprayed over heat exchange tubes 17 to wet them and aid in evaporation of the refrigerant and cooling of heat exchange tubes 17. Lines 52 and 53 are provided to conduct a heat exchange fluid, such as water, through heat exchange tubes 17 to cool the fluid by heat exchange with the evaporating refrigerant in evaporator 15. This cooled heat exchange fluid is then passed to suitable remotely located heat exchangers to provide cooling in the desired areas.

While aqueous lithium bromide is a highly satisfactory and desirable absorbent solution for many applications, its use imposes a number of limitations on the design of an absorption refrigeration system. For example, the use of excessively cold cooling water in the absorber can result in crystallization of the absorbent salt. Thus, it may be desirable to design a system which utilizes a cooling medium having a lower temperature than that for which a lithium bromide absorption machine is normally designed and hence a greater solubility range of absorbent salt may be desired. In other instances, it may be desirable to design an absorption refrigeration system wherein the cooling medium is at a higher temperature than that which will produce a satisfactory low evaporator temperature in a lithium bromide machine. Consequently, it is desirable to provide an absorbent salt solution having a relatively lower vapor pressure for a given solution temperature than that which can be obtained with a lithium bromide salt solution. Furthermore, it may sometimes be desirable to design a multistage or air cooled absorption refrigeration machine utilizing a generator temperature higher than that which can be utilized with a lithium bromide solution without resulting in an excessive corrosion rate.

In accordance with this invention, it has been discovered that an aqueous solution of lithium chlorate possesses the desired advantages of high solubility, low vapor pressure, and produces relatively low corrosion of mild steel surfaces at high temperatures.

FIGURE 2 illustrates graphically the relative vapor pressure-temperature characteristics of an absorbent solution of lithium chlorate which is saturated at 77° F. in comparison with a commonly used absorbent solution of lithium bromide which is saturated at 77° F. From this graph, it will be seen that at all solution temperatures between 110° F. and 150° F., the vapor pressure of the lithium chlorate solution is lower than that of the corresponding lithium bromide solution. Consequently, the use of an aqueous lithium chlorate absorbent solution can provide a desirably low evaporator temperature at a higher absorber temperature than that which can be achieved by using a lithium bromide absorbent solution. It follows that a cooling medium such as the effluent of a chemical process having a higher temperature than the standard 85° F. cooling water temperature used in design of lithium bromide machines may be employed in an absorption machine having a lithium chlorate absorbent solution.

The data illustrated in FIGURE 2 was obtained by making dew point measurements on solutions at different temperatures by the following technique. A closed steel vessel of approximately 8 x 18 inches was filled to a level of about 6 inches with a solution of substantially pure lithium chlorate or lithium bromide which was saturated at 77° F., the concentration and composition of which were verified by standard analytical techniques. The steel vessel included a recirculation loop and a pump which withdrew solution from the bottom of the vessel and sprayed it from a spray nozzle at the top of the vessel. The vessel included a wet wick thermometer which was continually wetted by a small quantity of water, the evaporation of which has a negligible effect on the concentration of the substantially larger volume of solution in the vessel. The recirculated solution was heated with a steam jacket placed around the recirculation line. The temperature of the solution sprayed in the vessel was measured with a thermometer disposed in the recirculation line. The vessel was purged of air and other noncondensible gases.

The continuously recirculated solution was heated to a desired temperature by passing steam through the steam jacket. Readings of the solution temperature and wet wick thermometer temperature were taken when the vapor pressure and temperatures had reached equilibrium. The wet wick temperature was then coverted by using a standard steam table to solution vapor pressures. The accuracy of this technique was estimated to be about plus or minus .1 millimeter of mercury. The results of applying this technique for lithium chlorate and lithium bromide absorbent solutions at various temperatures were then plotted to provide the data shown in FIGURE 2.

It was found that lithium bromide has a solubility of about 61 percent by weight in a saturated aqueous solution at 77° F. whereas lithium chlorate has a solubility of about 81 percent by weight in a saturated aqueous solution at 77° F. Thus, for a given concentration of absorbent salt in the absorber, the lithium chlorate may be cooled to a lower temperature without danger of crystallization than that of a similar lithium bromide solution. Consequently, an absorption refrigeration system utilizing an aqueous lithium chlorate absorbent solution may tolerate a lower cooling water temperature in the absorber than that which is permissible when using the same concentration of lithium bromide in the machine. Consequently, a lithium chlorate solution may be used as an absorbent under more widely varying conditions of cooling water temperature than previously known absorbent solutions. It was also found that lithium chlorate was compatible with mild steel surfaces at temperatures as high as 350° F. when inhibited with sufficient lithium hydroxide to prevent hydrolysis. Also, it was found that a lithium chlorate solution exhibited an affinity for absorption of water vapor. Further, the use of lithium chlorate is economically attractive as an absorbent solution in an absorption refrigeration system.

While for purposes of illustration a typical water cooled absorption refrigeration system has been described, it will be appreciated that a lithium chlorate absorbent solution may be utilized, because of its characteristics, in an air cooled absorption refrigeration system where the absorber temperature is usually higher than for water cooled machines, or in a multistage absorption refrigeration system, where advantage can be taken of its relatively wide range of solubility and its relatively low vapor pressure characteristics. Also, other refrigerants such as methylamine may be employed with the absorbent disclosed herein.

Other modifications and embodiments of this invention may be encompassed within the scope of the following claim.

I claim:

An absorption refrigeration system having an evaporator, an absorber, a generator, and a condenser connected to provide refrigeration, which employs water in the evaporator as a refrigerant and a liquid absorbent solution in the absorber to absorb refrigerant vapor; wherein the improvement comprises the absorbent solution consisting essentially of lithium chlorate dissolved in water.

References Cited by the Examiner

UNITED STATES PATENTS

| | | | |
|---|---|---|---|
| 1,961,890 | 6/1934 | Miller et al. | 252—69 |
| 3,004,919 | 10/1961 | Rush et al. | 252—67 |
| 3,158,008 | 11/1964 | Aronson | 62—476 |

LLOYD L. KING, *Primary Examiner.*